United States Patent
Yeu

(10) Patent No.: US 10,358,776 B1
(45) Date of Patent: Jul. 23, 2019

(54) APPARATUS, SYSTEM, AND METHOD FOR SURFACE REPAIR

(71) Applicant: David Yeu, Englewood, NJ (US)

(72) Inventor: David Yeu, Englewood, NJ (US)

(*) Notice: Subject to any disclaimer, the term of this patent is extended or adjusted under 35 U.S.C. 154(b) by 0 days.

(21) Appl. No.: 16/122,205

(22) Filed: Sep. 5, 2018

Related U.S. Application Data

(60) Provisional application No. 62/722,614, filed on Aug. 24, 2018.

(51) Int. Cl.
*E01C 9/08* (2006.01)
*E01C 11/00* (2006.01)
*E01C 5/22* (2006.01)

(52) U.S. Cl.
CPC ............... *E01C 9/086* (2013.01); *E01C 5/22* (2013.01); *E01C 11/005* (2013.01)

(58) Field of Classification Search
CPC ... E01C 9/08; E01C 9/086; E01C 5/22; E01C 11/005; E01C 7/35
See application file for complete search history.

(56) References Cited

U.S. PATENT DOCUMENTS

| | | | | |
|---|---|---|---|---|
| 5,183,353 A | * | 2/1993 | Buckelew | E01C 11/005 404/69 |
| 5,660,498 A | * | 8/1997 | Freeman | E01C 11/005 404/17 |
| 5,749,674 A | * | 5/1998 | Wilson, Sr. | E01C 7/187 404/75 |
| 6,093,468 A | | 7/2000 | Toms et al. | |
| 6,309,137 B1 | | 10/2001 | Hirsch | |
| 7,967,526 B2 | * | 6/2011 | Aguilera Galeote | E01F 9/529 404/15 |
| 8,702,343 B1 | * | 4/2014 | Vitale | E01C 7/358 404/17 |
| 9,605,391 B1 | * | 3/2017 | Ayala | E01C 23/10 |
| 2003/0091389 A1 | * | 5/2003 | Zentner | E01C 11/005 404/17 |
| 2006/0204332 A1 | * | 9/2006 | Boudreau | E01C 11/005 404/77 |
| 2009/0252553 A1 | * | 10/2009 | Bowers | E01C 11/005 404/47 |
| 2013/0149035 A1 | * | 6/2013 | Geary | E01C 5/12 404/70 |
| 2014/0017004 A1 | * | 1/2014 | Geary | E01C 23/10 404/45 |
| 2014/0252682 A1 | * | 9/2014 | Barron | E01C 11/005 264/334 |
| 2015/0016885 A1 | | 1/2015 | Barron et al. | |
| 2016/0160456 A1 | * | 6/2016 | Bullivant | E01C 7/187 404/32 |
| 2016/0177516 A1 | * | 6/2016 | Penland, Jr. | E01C 9/086 404/35 |
| 2018/0030667 A1 | * | 2/2018 | Penland, Jr. | E01C 5/18 |

* cited by examiner

*Primary Examiner* — Abigail A Risic
(74) *Attorney, Agent, or Firm* — James M. Smedley LLC

(57) ABSTRACT

A surface recess repair assembly is disclosed. The surface recess repair assembly has a surface recess repair housing that forms a cavity. The surface recess repair assembly also has a fill material disposed in the cavity. The cavity is sealed by the surface recess repair housing. Also, the surface recess repair housing is flexible. The fill material is a viscoelastic material.

20 Claims, 8 Drawing Sheets

APPARATUS, SYSTEM, AND METHOD FOR SURFACE REPAIR

RELATED APPLICATIONS

This application claims the benefit of U.S. provisional patent application 62/722,614 filed Aug. 24, 2018, which is hereby incorporated by reference in its entirety.

TECHNICAL FIELD

The present disclosure generally relates to an apparatus, system, and method for repair, and more particularly to an apparatus, system, and method for surface repair.

BACKGROUND

Conventional methods for patching potholes, such as temporary repair of potholes, typically involve excessive time and labor to perform. The American Automobile Association (AAA) presented a study in 2016 that explained how American drivers spend on average $3 billion annually on damage caused by potholes, confirming that potholes pose a significant problem even in a developed country.

Pothole formation is typically more prevalent in colder months and in colder climates due to the freeze-thaw cycle. This cycle occurs when the weather fluctuates from below-freezing temperatures to relatively warmer temperatures. When water from precipitation permeates into an asphalt or concrete road, the water may be soaked up by a mixture of gravel and soil disposed beneath the road. Once the ambient temperature falls below the freezing point, the water that is absorbed by the gravel and soil under the road freezes and expands, which results in weakened pavement. A combination of recurring freeze-thaw cycles and applied forces from traffic to a road typically creates potholes. Similar pothole creation may also occur in areas such as parking lots, factory surfaces, and other surfaces affected by the freeze-thaw cycle and applied forces (e.g., by vehicles). For example, relatively heavy vehicles such as forklifts operating on a factory floor may cause impacts that lead to pothole creation in areas such as loading docks. Potholes therefore pose a widespread problem to public and private infrastructure.

The most widely used conventional method to patch potholes is the use of hot-mix asphalt and cold-mix asphalt. However, during cold months and/or cold climates (e.g., from November to March in many U.S. states), temperatures remain too cold to obtain and use hot-mix asphalt (e.g., hot-mix asphalt plants often shut down during cold periods because their customers are unable to use the hot-mix asphalt at cold temperatures). This typically forces municipalities and other infrastructure owners to temporarily patch potholes using cold-mix asphalt, also known as "cold patch," during the colder months when potholes are more prevalent. Cold-mix asphalt is different from hot-mix asphalt due to the additives used to make this type of asphalt, which make cold-mix asphalt usable at colder temperatures.

Cold-mix asphalt involves excessive time for application by workers, and typically involves a high risk of failure in cold and wet conditions, which makes it a flawed solution for quickly patching surfaces such as paved surfaces. For example, cold-patching typically involves a burdensome process in which 2-4 crew members sweep out debris within a pothole, obtain and pour cold-mix asphalt into the pothole, and compact (e.g., tamp) the cold-mix asphalt to set the material into potholes. The process of applying cold-mix asphalt involves up to 20 minutes or more per pothole depending on conditions, which is a significant amount of time, labor, and cost for municipalities and other infrastructure owners. For example, major cities may experience thousands or even hundreds of thousands of potholes formed during a single winter (e.g., over a 3-5 month period).

Almost all municipalities responsible for patching potholes do not have enough employees to patch all potholes in a timely manner due to the number of potholes and other obligations of municipalities (e.g., street cleaning and snow removal). Additionally, cold weather and wet conditions put pothole patches using cold-mix asphalt at high risk of failure because these conditions prevent the cold-mix asphalt from properly adhering to the pavement. Municipalities may accordingly repair the same pothole multiple times because of cold-mix asphalt failure, resulting in a waste of time and money.

U.S. patent publication number US 2015/0016885 provides another approach to filling potholes, which involves placing non-Newtonian fluids such as a corn starch mixture in a tied bag. This approach is limited by the non-Newtonian behavior of the filled bags, as well as the configuration and properties of the bags themselves, which may not provide a desired effect when vehicles drive over the bags. Accordingly, there is a need in the art for an efficient and effective technique for quickly repairing potholes to provide a safe surface for vehicular traffic.

The exemplary disclosed system, apparatus, and method of the present disclosure is directed to overcoming one or more of the shortcomings set forth above and/or other deficiencies in existing technology.

SUMMARY OF THE DISCLOSURE

In one exemplary aspect, the present disclosure is directed to a surface recess repair assembly. The surface recess repair assembly includes a surface recess repair housing forming a cavity, and a fill material disposed in the cavity. The cavity is sealed by the surface recess repair housing. The surface recess repair housing is flexible. The fill material is a viscoelastic material.

In another aspect, the present disclosure is directed to a pothole repair method. The pothole repair method includes providing one or more pothole repair assemblies including a pothole repair housing forming a cavity, a viscoelastic material being disposed in the cavity. The pothole repair method also includes disposing the one or more pothole repair assemblies in a pothole at a first time, and removing the one or more pothole repair assemblies from the pothole at a second time. The cavity is sealed by the pothole repair housing. The pothole repair housing is flexible. The pothole is subject to vehicular traffic between the first time and the second time.

DETAILED DESCRIPTION AND INDUSTRIAL APPLICABILITY

Figure 1:
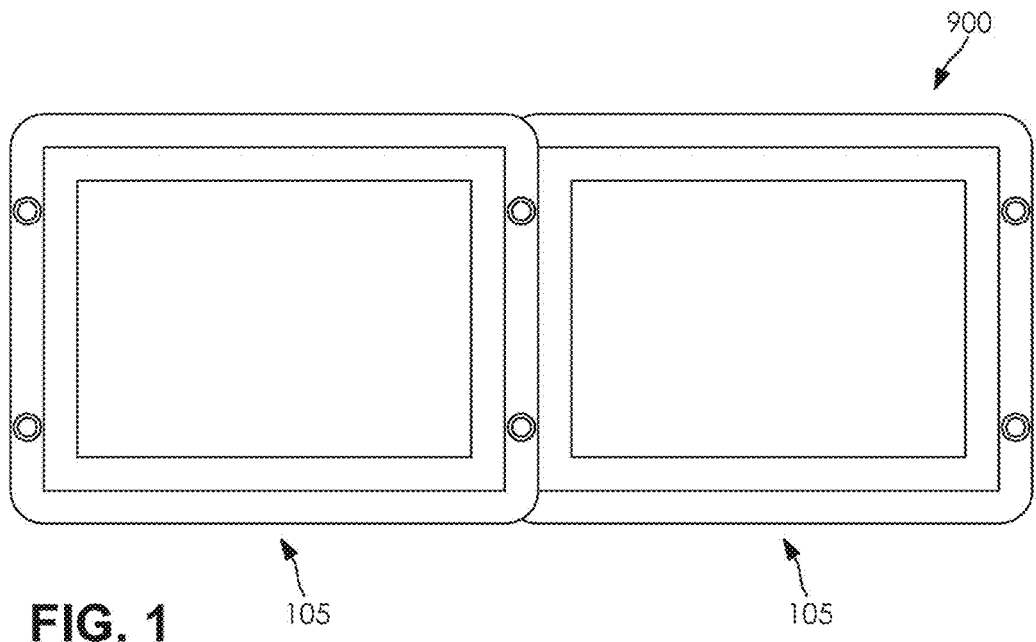
FIG. 1 is a top view of an exemplary apparatus in accordance with an embodiment of the present invention.

FIG. 1 illustrates an exemplary system 100. System 100 may be used for patching (e.g., temporary patching) of any suitable surface. System 100 may be used for patching any suitable recess or cavity in any desired surface such as, for example, a pothole. System 100 may be used for patching potholes (e.g., temporarily patching potholes) in roads, parking lots, bridges, parking garages, driveways, factory floors, and/or any other surface of public, private, and/or commercial infrastructure. For example, system 100 may be used for repairing potholes in surfaces subject to vehicular traffic and/or the freeze-thaw cycle.

System 100 may include one or more assemblies 105. Each exemplary assembly 105 may be attachable (e.g., removably attachable) to one or more other assemblies 105 as described for example below. Each assembly 105 may include exemplary material as disclosed for example below.

Figure 2:
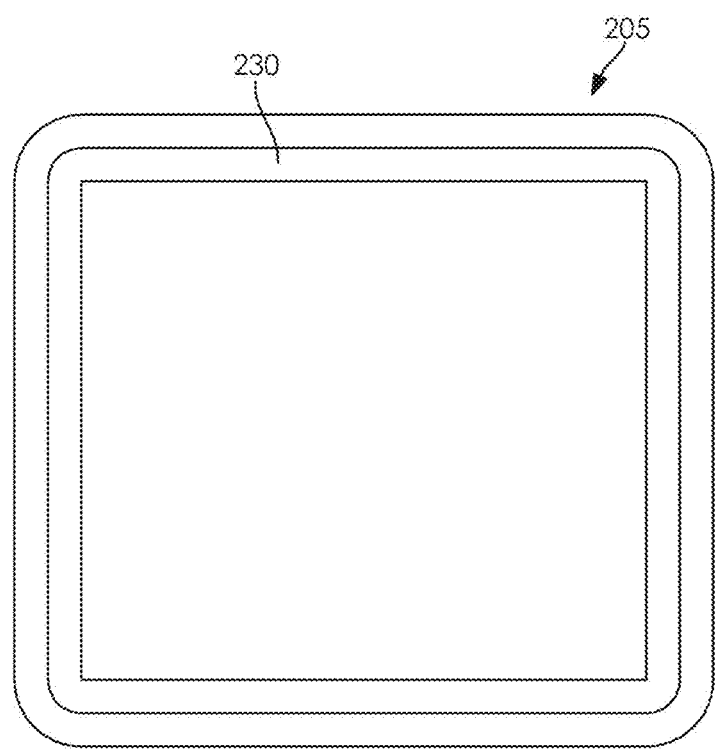
FIG. 2 is a top view of an exemplary apparatus in accordance with an embodiment of the present invention.
Figure 3:
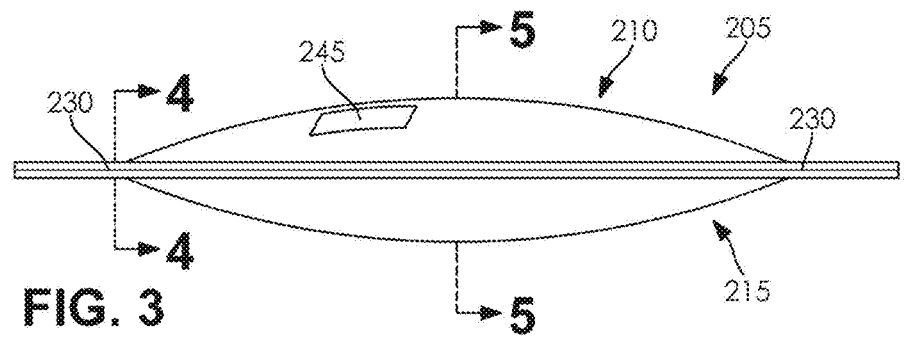
FIG. 3 is a side view of an exemplary apparatus in accordance with an embodiment of the present invention.
Figure 4:
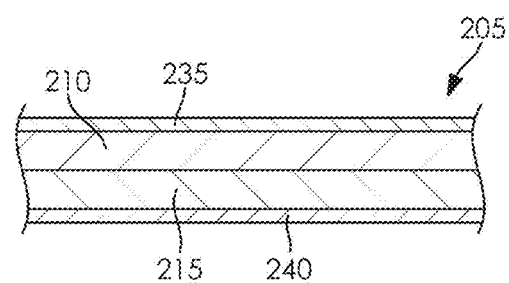
FIG. 4 is a sectional view of an exemplary apparatus in accordance with an embodiment of the present invention.
Figure 5:
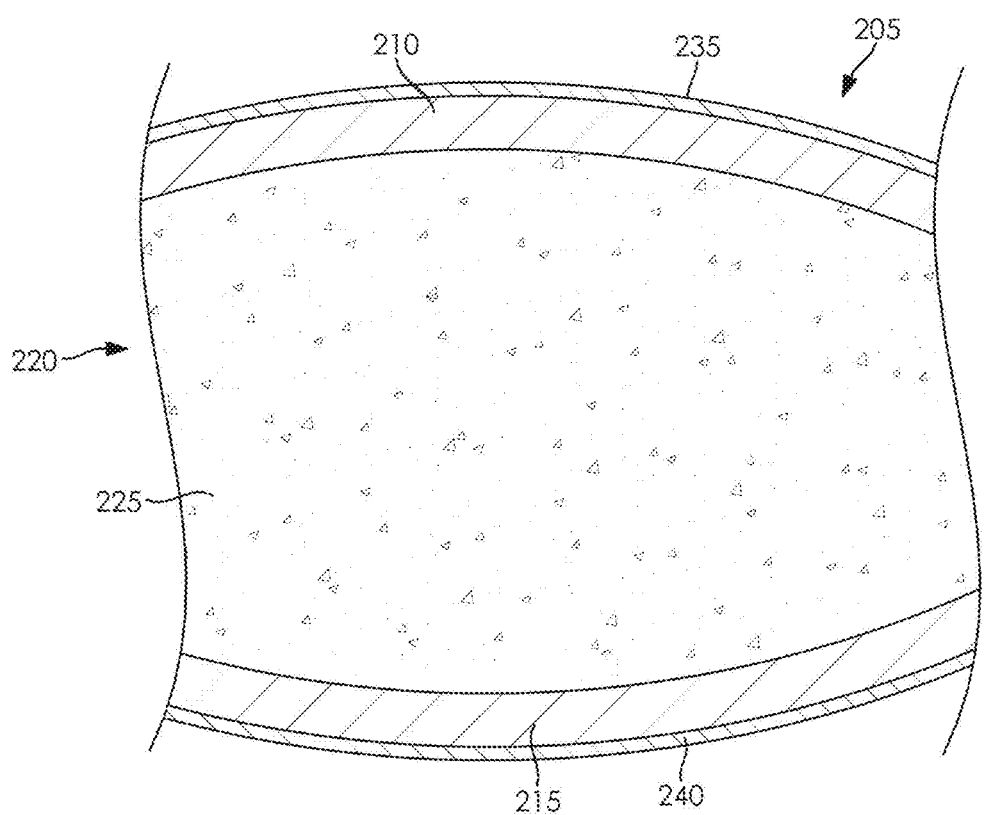
FIG. 5 is a sectional view of an exemplary apparatus in accordance with an embodiment of the present invention.

FIGS. 2-5 illustrate an exemplary assembly 205 that may be similar to assembly 105. FIG. 4 illustrates a section 4-4 taken through FIG. 3, and FIG. 5 illustrates a section 5-5 taken through FIG. 3. One or more assemblies 205 may be used as a system that may be similar to system 100 (e.g., a plurality of assemblies 205 may be attached together as described for example herein).

Assembly 205 may include a first housing member 210 and a second housing member 215 that may be attached together to form a cavity 220. Housing members 210 and 215 may thereby form a housing forming cavity 220. A material 225 may be disposed within cavity 220.

First housing member 210 may for example be a top member of a housing that may be attached to second housing member 215, which may be a bottom member of the housing. Housing members 210 and 215 may be attached to each other by any suitable technique for forming a cavity to hold material such as, for example, by heat sealing, adhesive sealing, and/or any other suitable method for creating a seal. For example as illustrated in FIGS. 2 and 3, a seal 230 may be created between housing members 210 and 215 by any suitable technique. Seal 230 may for example partially or substantially completely seal cavity 220. For example, cavity 220 including material 225 may be substantially entirely sealed via seal 230. In at least some exemplary embodiments, seal 230 may be a substantially air-tight seal that hermetically seals cavity 220 holding material 225. Alternatively for example, housing members 210 and 215 may be integral portions of a single integral housing that may partially or substantially entirely seal cavity 220.

Housing members 210 and 215 may be formed from any suitable material for housing material 225 in cavity 220. For example, housing members 210 and 215 may be formed from any suitable durable material. Also for example, housing members 210 and 215 may be formed from any suitable impermeable material. For example, housing members 210 and 215 may be impermeable to a flow of material 225 and may thereby maintain material 225 in cavity 220 with substantially no leakage or exit of material 225. For example, housing members 210 and 215 may be impermeable to a flow of gaseous fluid, liquid fluid, and/or solid material. It is also contemplated that housing members 210 and 215 may be partially or substantially entirely permeable to a flow of gaseous fluid, liquid fluid, and/or solid material in at least some exemplary embodiments.

In at least some exemplary embodiments, housing members 210 and 215 may be formed from any suitable flexible and/or elastic materials. Housing members 210 and 215 may be formed from durable material. For example, housing members 210 and 215 may be formed from flexible and/or elastic material that may be stretchable or expandable when subjected to an external force, and may return to their original shape when the external force is removed. For example, housing members 210 and 215 may be formed from any suitable stretchable or expandable materials. Also for example, housing members 210 and 215 may be formed from material such as nylon material, elastomeric material, natural rubber, synthetic rubber, neoprene, latex, chloroprene, vinyl material, flexible Polyvinyl Chloride (PVC), Polyethylene (PE), Polypropylene (PP), thermoplastic elastomers, or any other suitable type of fabric, textile, or material having flexible and/or elastic properties.

In at least some exemplary embodiments, housing members 210 and 215 may also be formed from any suitable flexible materials that may be durable and that may be substantially non-stretchable and/or substantially non-expandable. For example, housing members 210 and 215 may be formed from flexible, substantially non-stretchable, and/or substantially non-expandable material such as plastic material, plastic-like material, composite material, or a hybrid material including polymeric, plastic, and/or any other suitable material for allowing a change of shape while substantially preventing a stretching or expansion of housing members 210 and 215. In at least some exemplary embodiments, housing members 210 and 215 may be formed by flexible material that may change shape without stretching or expanding. For example, housing members 210 and 215 may be formed from substantially non-stretchable and/or substantially non-expandable elastomeric, Polyvinyl Chloride (PVC), Polyethylene (PE), and/or Polypropylene (PP) materials.

In at least some exemplary embodiments, the exemplary system may include one or more assemblies 205 having housing members 210 and 215 that may be formed from durable and flexible materials that may be elastic, expandable, and/or stretchable, and one or more assemblies 205 having housing members 210 and 215 that may be formed from durable and flexible materials that may be substantially non-stretchable and/or substantially non-expandable, as disclosed for example above.

In at least some exemplary embodiments, the exemplary system may include one or more assemblies 205 including housing members 210 and 215 formed from a mixture or combination of materials that may be flexible and elastic (e.g., expandable and/or stretchable), and also flexible, substantially non-stretchable, and/or substantially non-expandable. For example, housing members 210 and 215 may be formed from materials that may be flexible and partially expandable and/or partially stretchable (e.g., expandable and/or stretchable to a partial degree such as by between about 2% and about 25%, between about 2% and about 20%, or between about 2% and about 10% of a dimension of housing members 210 and 215). For example, housing members 210 and 215 may stretch or expand up to a certain or predetermined amount.

Housing members 210 and 215 may have for example substantially similar dimensions and/or configurations to form a housing of a desired size. Housing members 210 and 215 may have any suitable thickness such as, for example, between about 1/16" and about 3/4", between about 1/16" and about 1/2", between about 1/16" and about 3/8", between about 1/16" and about 1/4", between about 1/16" and about 1/8", and/or any other suitable thickness for forming cavity 220 for holding material 225. Housing members 210 and 215 may have length and/or width dimensions of between about 6" and about 36", between about 10" and about 24", between about 12" and about 20", and/or between about 15" and about 20". For example, housing members 210 and 215 may form a housing having overall dimensions at least 6" in length by at least 6" in width by at least 1" in thickness when filled with material 225 (e.g., the thickness illustrated in FIG. 5 may be at least 1" in thickness). For example, assembly 205 may have overall length-by-width-by-thickness dimensions of between about 6"×6"×1/2" and about 36"×36"×6" (e.g., or more), between about 8"×8"×1" and about 30"×30"×6", between about 10"×10"×1" and about 24"×24"×4", and/or between about 12"×12"×1" and about 20"×20"×3". For example, assembly 205 may have overall length-by-width-by-thickness dimensions of about 14"×14"×2", about 15"×20"×2.5, or about 15"×20"×2.75". For example, assembly 205 may have overall length-by-width-by-thickness dimensions of up to about 5 feet (e.g., or more)×up to about 5 feet (e.g., or more)×up to about 1 feet (e.g., or more). Also for example, assembly 205 may have overall length-by-width-by-thickness dimensions of up to about 10 feet (e.g., or more)×up to about 10 feet (e.g., or more)×up to about 1 feet (e.g., or more). For example, assembly 205 may have any desired shape (e.g., as viewed in plan) such as square, rectangular, triangular, polygonal, circular, elliptical, and/or any other desired shape and dimensions.

In at least some exemplary embodiments, housing members 210 and 215 may be coated with one or more coatings. For example, first housing member 210 may be coated with a layer 235 and second housing member 215 may be coated with a layer 240. Layers 235 and 240 may be applied to respective housing members 210 and 215 by any suitable technique such as, for example, spray coating, dip-coating, brush coating (e.g., application by brushing a coating onto housing members), sol-gel coating, powder coating, spray coating, foam finishing, direct roll coating, calender coating, pad-dry-cure coating, floating knife coating, hot melt extrusion coating, and/or coating using soluble conducting polymers. It is also contemplated that techniques similar to high-velocity oxygen fuel (HVOF) spraying, combustion powder spraying, twin wire arc spraying, combustion wire spraying, plasma transfer wire arc spraying, and/or combustion flame spraying may be used in at least some exemplary embodiments, depending on materials forming housing members 210 and 215.

Layers 235 and 240 may be formed from any suitable materials for coating housing members 210 and 215 (e.g., such as coating an exterior surface of housing members 210 and 215). For example, layers 235 and 240 may be formed from flexible materials such as urethane, nylon material, elastomeric material, natural rubber, synthetic rubber, neoprene, latex, chloroprene, vinyl material, flexible Polyvinyl Chloride (PVC), Polyethylene (PE), Polypropylene (PP), thermoplastic elastomers, and/or any other suitable material having flexible and/or elastic properties. For example, layers 235 and 240 may include rubberized material. In at least some exemplary embodiments, layers 235 and 240 may be urethane coatings, rubber coatings, flexible coatings such as Rust-Oleum®, and/or acrylic conformal coatings (e.g., acrylic fabric paint).

Layers 235 and 240 may have any suitable thickness for coating housing members 210 and 215. For example, layers 235 and 240 may be between about 0.001" (e.g., about 1 mil) and about 0.25" (e.g., about 250 mils), between about 0.001" and about 0.1" (e.g., about 100 mils), between about 0.001" and about 0.05" (e.g., about 50 mils), between about 0.002" (e.g., about 2 mils) and about 0.02" (e.g., about 20 mils), between about 0.004" (e.g., about 4 mils) and about 0.015" (e.g., about 15 mils), and/or between about 0.006" (e.g., about 6 mils) and about 0.012" (e.g., about 12 mils). In at least some exemplary embodiments, layers 235 and 240 may be urethane coatings, and housing members 210 and 215 may form a urethane-coated nylon housing having an overall thickness of 40 mm (e.g., about 1.5") that contains material 225.

Housing members 210 and 215 coated with respective layers 235 and 240 may provide a durable housing that may protect cavity 220 from being punctured, popped, and/or ruptured so as to cause leak formation. For example, the exemplary housing may withstand external forces and damaging effects caused by traffic from vehicles of all sizes, inclement weather, and/or friction from jagged contours that may be found at a bottom of a recess such as a pothole.

Material 225 may fill some or substantially all of cavity 220. For example, cavity 220 may be filled with a mixture of material 225 and air (e.g., or other gaseous fluid). Material 225 may be any suitable material for being disposed and/or sealed in cavity 220 to facilitate an operation of assembly 205 as described herein. For example, material 225 may be a viscoelastic material. For example, material 225 may be a resilient, shock-absorbing and/or vibration-absorbing material. Material 225 may be a shock-absorbing and/or vibration-absorbing material that may have properties that remain substantially constant over a range of ambient (e.g., outdoor) temperatures. For example, material 225 may be a material that behaves substantially similarly or constantly over a range of temperatures (e.g., a range of ambient temperatures and/or a range of temperatures of material 225 itself) such as between about −30 degrees Fahrenheit and about 150 degrees Fahrenheit (e.g., or less than about −30 degrees Fahrenheit and/or higher than about 150 degrees Fahrenheit). For example, material 225 may be substantially ambient-temperature-independent and/or inclement-weather-independent.

Material 225 may be any suitable material having both viscous properties and elastic properties. For example, material 225 may exhibit viscous properties such as time-dependent strain. Material 225 may exhibit elastic properties such as deforming from an initial position or shape under a load and then returning to the initial position or shape when the load is removed. For example, material 225 may creep from an original shape when subjected to an external force and then return to the original shape when the external force is removed. For example, material 225 may lose or dissipate energy when an external load is applied and/or removed (e.g., from a tire of a vehicle rolling over assembly 205). For example, material 225 may exhibit strain lagging stress under an external load (e.g., by less than a 90 degree phase lag associated with purely viscous material).

In at least some exemplary embodiments, material 225 may include a liquid fluid material and/or a foam material. It is also contemplated that material 225 may include a gaseous fluid, liquid fluid, foam, gel, and/or solid material (e.g., or a mixture of one or more of these materials). Material 225 may include substantially entirely non-toxic material. It is also contemplated that some or substantially all material 225 may include toxic material.

Material 225 may include a synthetic polymer or natural polymer material. Material 225 may include an elastomeric material. In at least some exemplary embodiments, material 225 may include ethylene-propylene diene monomer rubber (EPDM rubber), butyl rubber, synthetic polyisoprene, natural polyisoprene, polybutadiene, polynorbornene, and/or styrene-butadiene rubber material.

In at least some exemplary embodiments, material 225 may include polymer foam material, polyethylene foam material, polyolefin foam material, plastic foam material, and/or polystyrene foam material. Material 225 may include a viscoelastic foam material such as, for example, polyurethane-based foam material. For example, material 225 may include an open-celled polyurethane-based viscoelastic foam material. In at least some exemplary embodiments, material 225 may include polynorbornene foam material, butyl rubber foam material, synthetic polyisoprene foam material, polybutadiene foam material, styrene-butadiene foam material, neoprene foam material, plasticized polyvinylchloride foam material, nitrile rubber foam material, polyurethane foam material, and/or natural rubber foam material. In at least some exemplary embodiments, material 225 may include medium density polyethylene foam material, low density polyethylene foam material, linear low density polyethylene foam material, polypropylene copolymer foam material, ethylene-vinyl acetate copolymer foam material, ethylene methyl acrylate copolymer foam material, ethylene ionomer foam material, polypropylene foam material, and/or high density polyethylene foam material.

In at least some exemplary embodiments, material 225 may include high damping rubber material, resilient rubber foam, polyurethane gel, polyvinylchloride plastisol gel, high damping polyurethane, and/or resilient thermoplastic laminate material. Also for example, material 225 may include cork material.

As illustrated in FIG. 3, assembly 205 may have an elliptical or ramped shape or structure based on a configuration of housing members 210 and 215 housing material 225. For example, assembly 205 may provide a ramp extending from outer portions of assembly 205 toward an apex at a central portion of ramp 205. As objects (e.g., a tire of a vehicle) move over assembly 205, they may move up a ramp from an edge portion of assembly 205 to a central portion of assembly 205 based on a configuration provided by the shape of assembly 205, and then may move down a ramp from the central portion of assembly 205 to an edge portion of assembly 205 based on the configuration provided by the shape of assembly 205. Objects (e.g., a tire of a vehicle) may also partially move up and down the ramped shape or structure of assembly 205 (e.g., from an edge portion to a portion between the edge portion and a central portion of assembly 205, and then back toward another edge portion of assembly 205). Assembly 205 may thereby help to provide a smooth movement of objects (e.g., a vehicle driving over assembly 205 on one or more tires) passing over assembly 205.

In at least some exemplary embodiments, assembly 205 may include one or more radio-frequency identification (RFID) components 245 (e.g., tag). For example, RFID component 245 may be disposed within housing members 210 and/or 215, within layers 235 and/or 240, between housing members 210 and/or 215 and respective layers 235 and/or 240, within material 225 disposed in cavity 220, and/or attached to an exterior surface of assembly 205. RFID component 245 may communicate with an RFID reader disposed externally to assembly 205 by any suitable technique for RFID operation. For example, RFID component 245 may communicate with an RFID reader operated by a user of assembly 205 (e.g., a handheld RFID reader or processing device held by a user, a vehicle-mounted RFID reader or processing device, and/or any other suitable RFID reader or processing device). RFID component 245 may provide data to the RFID reader or processing device regarding assembly 205 such as, for example, a manufacturing date of assembly 205, a date on which use of assembly 205 began, and/or a number of times of usage of assembly 205. The RFID reader or processing device may also receive and/or operate in conjunction with a computing device that may receive location data (e.g., GPS data). For example, the RFID reader or processing device and/or computing device may operate as part of a system that processes and correlates RFID data provided by RFID component 245 and location data provided by a location device (e.g., a GPS device located with a user of assembly 205, on a vehicle operated by the user, and/or in any other desired location). The exemplary system may use the collected RFID data and location data (e.g., as well as time data, ambient temperature data, and/or any other desired data) to track and analyze where, how often, when, and in what weather conditions assemblies 205 have been utilized.

Alternatively and/or additionally to the above-described RFID data, location data, and other data, assembly 205 may also be physically marked with identification data (e.g., a serial number). For example, component 245 may be a physical marking disposed on a surface of assembly 205. For example, a user of assembly 205 may use the identification number as input data to a system for tracking and/or analyzing use of one or more assemblies 205 in surface repair.

Figure 6:
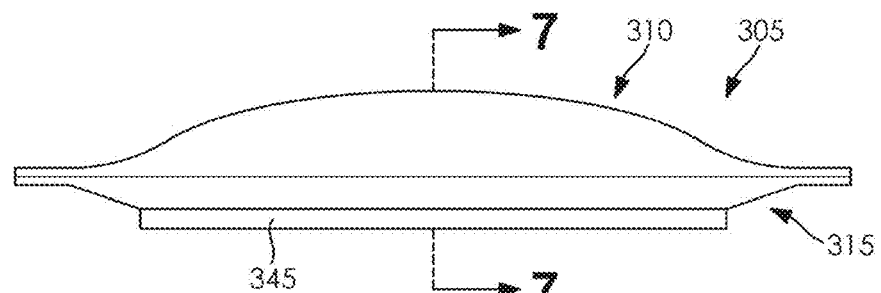
FIG. 6 is a side view of an exemplary apparatus in accordance with an embodiment of the present invention.
Figure 7:
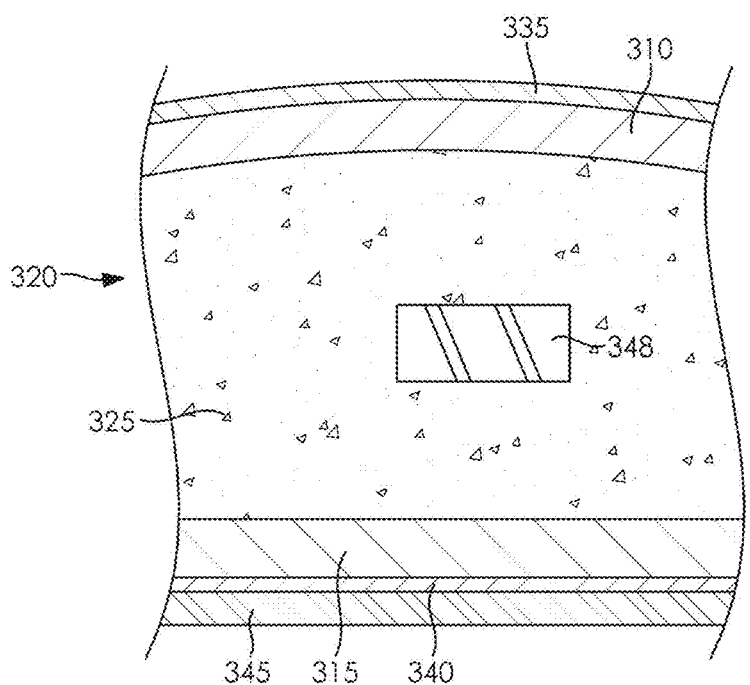
FIG. 7 is a sectional view of an exemplary apparatus in accordance with an embodiment of the present invention.

FIGS. 6 and 7 illustrate another exemplary embodiment of the exemplary apparatus and method. FIG. 7 illustrates a section 7-7 taken through FIG. 6. Assembly 305 may be similar to assemblies 105 and 205, and may have housing members 310 and 315 that may be similar to housing members 210 and 215 and may form a cavity 320 that may be similar to cavity 220. Cavity 320 may hold a material 325 that may be similar to material 225. Assembly 305 may also have layers 335 and 340 that may be similar to layers 235 and 240.

Figure 8:
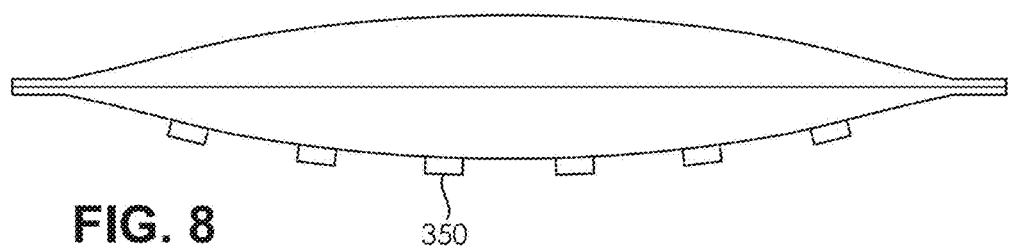
FIG. 8 is a side view of an exemplary apparatus in accordance with an embodiment of the present invention.

A member 345 may be attached to second housing member 315 (e.g., to layer 340). Member 345 may alternatively or additionally be attached to first housing member 310 (e.g., to layer 335). Member 345 may be attached to housing members 310 and/or 315 by any suitable technique such as, for example, adhesive, mechanical fasteners, wire or other flexible members wrapped around assembly 305, and/or any other suitable attachment technique. Member 345 may be a weight for helping assembly 305 to maintain a position when for example external forces are applied to the exemplary system (e.g., when a vehicle tire rolls over the exemplary system). Member 345 may be formed from metallic material (e.g., steel, lead, iron, aluminum, and/or any other suitable metallic material), heavy plastic, concrete, composite material, a water-filled or sand-filled (e.g., or filled with any other relatively heavy fill) housing having a fillable cavity, and/or any other relatively heavy member that may weigh down assembly 305. Member 345 may also for example be attached to a side portion of assembly 305. For example, member 345 may be one or more elongated members (e.g., a bar such as a reinforcing bar or any other suitably-shaped member) that may be attached to a side portion and/or a lower portion of assembly 305. FIG. 8 illustrates an exemplary embodiment in which a plurality of discrete members 350 that may be formed from materials similar to member 345 may be attached to an exemplary assembly. Discrete members 350 may allow a lower surface of the exemplary assembly to flexibly deform (e.g., to conform to a bottom of a pothole or other uneven surface).

Alternatively or additionally to member 345, a member 348 that may be formed from material similar to member 345 may be disposed within cavity 320 to provide a weight for assembly 305. Also for example, member 348 may be an elongated member (e.g., a bar such as rebar), a spherical or elliptical member, a pellet, and/or a member with any other desired shape. For example, a plurality of members 348 (e.g., weights) may be disposed within cavity 320. Alternatively or additionally for example, member 348 may take the form of an admixture (e.g., a fluid liquid and/or granular material that may act as a weight) that may be added to material 325. For example, a relatively heavy material serving as a weight for assembly 305 may be mixed in or integrated into material 325.

Figure 9:
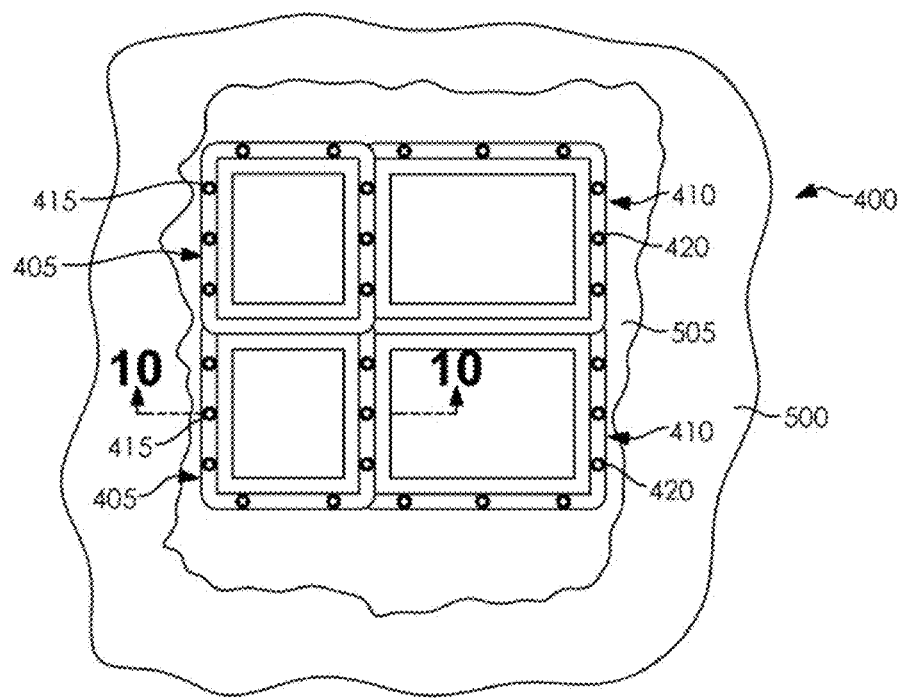
FIG. 9 is a top view of an exemplary apparatus in accordance with an embodiment of the present invention.
Figure 10:
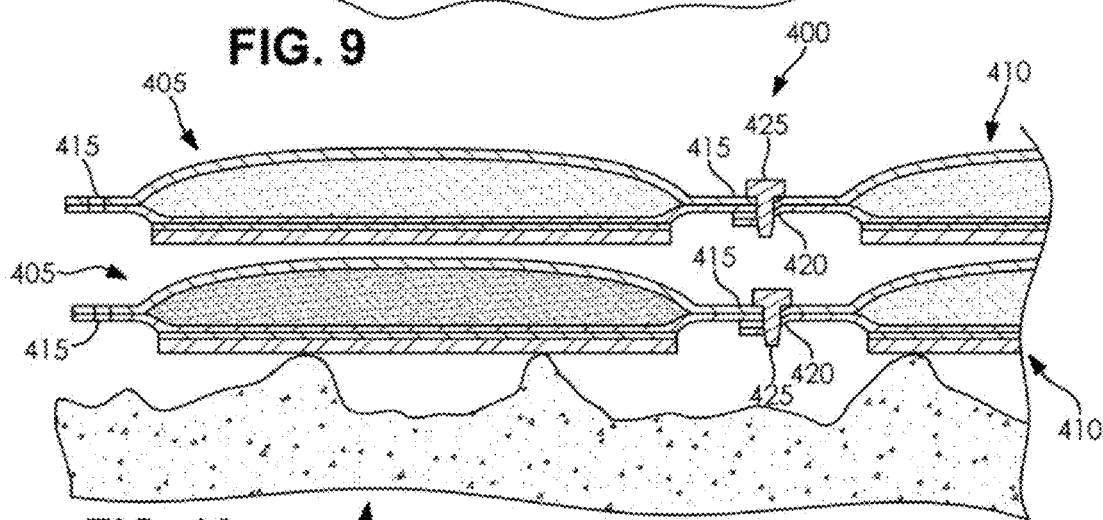
FIG. 10 is a sectional view of an exemplary apparatus in accordance with an embodiment of the present invention.

FIGS. 9 and 10 illustrate another exemplary embodiment of the exemplary apparatus and method. FIG. 10 illustrates a section 10-10 taken through FIG. 9. System 400 may include a plurality of assemblies 405 and 410 of varying dimensions that may be generally similar to assembly 205. System 400 may be placed in a recess 505 located within a surface layer 500. Recess 505 may be for example a pothole located within a surface layer 500 that may be a paved or unpaved surface. For example, surface layer 500 may be part of a road, driveway, parking lot, parking garage, airport area, factory floor, loading dock, port facility (e.g., container facility), bridge deck, and/or any other suitable public, commercial, industrial, and/or residential infrastructure.

Assemblies 405 and/or 410 may be arranged within recess 505 to substantially fill recess 505. For example as illustrated in FIG. 10, multiple layers of assemblies 405 and/or 410 may be stacked within recess 505 to substantially fill an entire depth of recess 505. Assemblies 405 and/or 410 may be attached to each other via any suitable attachment technique or device. For example, assemblies 405 and 410 may include respective aperture assemblies 415 and 420 formed in edge portions of assemblies 405 and 410. Aperture assemblies 415 and 420 may be for example structural portions having apertures that are attached in edge portions of assemblies 405 and 410 to provide an attachment device. Aperture assemblies 415 and 420 may be formed from any suitable structural material such as, for example, metallic material, plastic material, synthetic or natural rubber, elastomeric material, composite material, and/or any other suitable structural material. For example, aperture assemblies 415 and 420 may be grommet assemblies. For example as illustrated in FIG. 10, overlapping aperture assemblies 415 and/or 420 of adjacent assemblies 405 and/or 410 may be aligned and a fastener 425 may be inserted through the aligned apertures to fasten aperture assemblies 415 and/or 420. For example, fastener 425 may be any suitable fastener such as a threaded fastener (e.g., bolt and nut), flexible fastener (e.g., rubber or elastomeric fastener that may be press-fit into the aligned apertures of aperture assemblies 415 and 420), clip, and/or any other suitable fastener. Assemblies 405 and/or 410 may also be fastened together by any other suitable attachment technique such as snap-fit devices, hook and loop devices, adhesive components, magnetic attachment components, wire or flexible member attachment devices (e.g., wires or ties), and or any other suitable attachment technique. System 400 of any desired shape, depth, number of layers, and/or other desired configuration may thereby be provided.

In at least some exemplary embodiments, the exemplary system and method may provide a temporary surface repair location (e.g., for a pothole) that may be maintained until an additional and/or a permanent repair may be made. For example, the exemplary system may be provided and left at a location (e.g., in a pothole) for any desired period (e.g., hours, days, months). The exemplary apparatus may be removably disposed at a location (e.g., in a recess such as a pothole) for any desired amount of time. The exemplary apparatus may be quickly placed and removed as desired, and thereby may not involve excessive time and labor to place and/or remove. The exemplary apparatus may be reused at various locations over any desired time period (e.g., over a period of days, months, or years). The exemplary system and method may for example be operated by a single user. The exemplary system and method may provide a non-curable apparatus and technique for filling recesses in surfaces, and may not involve time for material to harden prior to opening to use such as traffic. For example, the exemplary material (e.g., material 225) may be sealed within an exemplary cavity (e.g., cavity 220) and may not be exposed to ambient air and/or harden and therefore may provide a non-curable system or apparatus for surface repair. The exemplary material (e.g., material 225) may be sealed within the exemplary assembly (e.g., assembly 205) so as not to cure or harden as an exposed curable material (e.g., exposed curable material such as concrete, bituminous concrete such as asphalt, grout, and/or any other curable material used in an exposed manner in order to cure or harden to repair a recess in a surface). The exemplary material (e.g., material 225) may thereby for example be non-curable.

In at least some exemplary embodiments, the exemplary system and method may include an assembly (e.g., a protective pad) used to fill potholes in a roadway surface and protect vehicles from the shock of traveling over a pothole. The assembly may include a fully enclosed, flexible container that may be filled with viscoelastic materials and a weight. The assembly may be fabricated with coated fabrics to withstand traffic from vehicles of all suitable sizes, inclement weather, and/or friction from jagged contours that may be found at the bottom of a recess such as a pothole. Viscoelastic materials may be used to fill a majority of a cavity of the flexible container and may provide shock-absorbing and vibration-absorbing properties. The cavity may also contain a weight to help maintain the assembly (e.g., protective pad) in a recess such as a pothole. Users may place as many protective pads as desired to fill up a significant portion of a pothole and mitigate or substantially prevent damage to vehicles caused by the shock of traveling over a pothole. When more than one protective pad is placed in a pothole, fasteners such as grommets disposed at the edges of the protective pads may allow the protective pads to be attached together.

In at least some exemplary embodiments, the exemplary disclosed assembly (e.g., assembly 105, assembly 205, assembly 305, assembly 405, and/or any other exemplary assembly disclosed herein) may include a surface recess repair housing (e.g., housing members 210 and 215, and/or housing members 310 and 315) forming a cavity (e.g., cavity 220 and/or cavity 320), and a fill material (e.g., material 225 and/or material 325) disposed in the cavity. The cavity may be sealed by the surface recess repair housing. The surface recess repair housing may be flexible. The fill material may be a viscoelastic material. The viscoelastic material may be a shock-absorbing material or a vibration-absorbing material. The viscoelastic material may have a constant behavior over a range of ambient temperatures of between about −30 degrees Fahrenheit and about 150 degrees Fahrenheit. The surface recess repair housing may be substantially non-expandable. The surface recess repair housing may be coated with a layer (e.g., layer 235, 240, 335, and/or 340) of flexible and elastic material. The surface recess repair housing that may be coated with the layer of flexible and elastic material may be impermeable to gaseous and liquid fluid flow. The viscoelastic material disposed in the cavity, which may be formed by the surface recess repair housing that may be coated with the layer of flexible and elastic material, may be non-curable. The viscoelastic material may include a viscoelastic foam material or a viscoelastic elastomeric material. The viscoelastic material may include ethylene-propylene diene monomer rubber, butyl rubber, synthetic polyisoprene, natural polyisoprene, polybutadiene, polynorbornene, styrene-butadiene rubber material, and/or cork material. The surface recess repair housing may include nylon material, elastomeric material, natural rubber, synthetic rubber, neoprene, latex, chloroprene, vinyl material, flexible Polyvinyl Chloride, Polyethylene, Polypropylene, and/or thermoplastic elastomers. The surface recess repair housing may be a nylon material that may be urethane-coated. The surface recess repair assembly may also include an RFID component (e.g., component 245).

In at least some exemplary embodiments, the exemplary disclosed system may include a first pothole repair housing (e.g., housing members 210 and 215, and/or housing members 310 and 315) forming a first sealed cavity (e.g., cavity 220 and/or cavity 320), a second pothole repair housing (e.g., housing members 210 and 215, and/or housing members 310 and 315) forming a second sealed cavity (e.g., cavity 220 and/or cavity 320), and a fill material (e.g., material 225 and/or material 325) disposed in the first and second sealed cavities. The first and second pothole repair housings may be removably attachable to each other. The first and second pothole repair housings may be flexible and substantially non-stretchable, and the fill material may be a viscoelastic material. At least one of the first and second pothole repair housings may include a weight (e.g., member 345, member 348, and/or member 350) disposed on a surface of the at least one of the first and second pothole repair housings or in at least one of the first sealed cavity and the second sealed cavity. The first and second pothole repair housings may be removably attachable to each other based on a fastener (e.g., fastener 425 or any other exemplary fastener disclosed herein) being fastened through both a first aperture of the first pothole repair housing and a second aperture of the second pothole repair housing. The first and second pothole repair housings may include an RFID component (e.g., component 245).

The exemplary disclosed apparatus and method may provide an efficient and effective technique for patching a pothole in a surface such as a paved or unpaved surface. For example, the exemplary apparatus and method may be used for temporary patching or any suitable surface repair. The exemplary apparatus and method may be used for patching any suitable recess or cavity in any desired surface such as, for example, a pothole. The exemplary apparatus and method may be used for patching potholes (e.g., temporarily patching potholes) in roads, parking lots, bridges, parking garages, driveways, factory floors, and/or any other surface of public, private, and/or commercial infrastructure. The exemplary apparatus and method may be used for repairing any surface subject to vehicular traffic. For example, the exemplary apparatus and method may be used for repairing potholes in surfaces subject to vehicular traffic and/or the freeze-thaw cycle. The exemplary apparatus and method may also be used in any desired surface improvement effort such as, for example, road improvement, dirt road improvement for military engineering applications, airport runway improvements, and/or any other desired surface improvement project.

Figure 11:
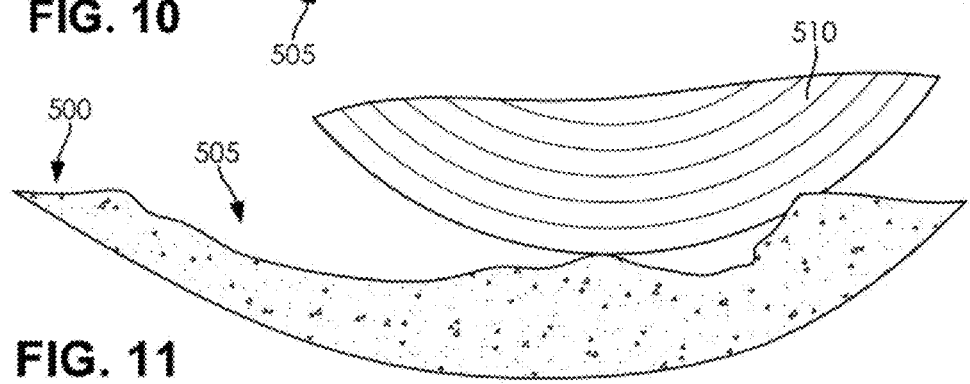
FIG. 11 is a sectional view of an exemplary apparatus in accordance with an embodiment of the present invention.

An exemplary operation of the exemplary apparatus and method will now be described. A recess 505 such as a pothole may be created in surface layer 500 for example as described above (e.g., based on surface layer 500 being subjected to the freeze-thaw cycle and/or vehicular traffic). As illustrated in FIG. 11, an object 510 such as a vehicle tire may enter into recess 505. Object 510 may for example be damaged by entering and then being ejected from recess 505 as a vehicle for example rolls over a pothole as described above.

Figure 12:
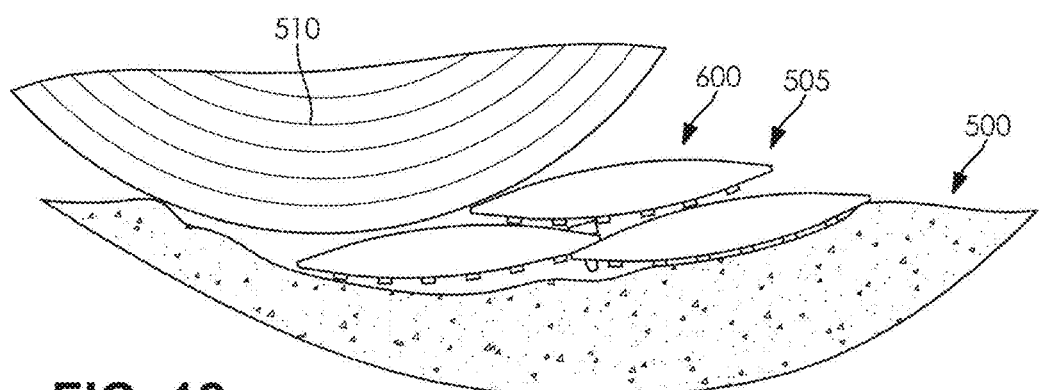
FIG. 12 is a side view of an exemplary apparatus in accordance with an embodiment of the present invention.

As illustrated in FIG. 12, an exemplary system 600 that may include assemblies similar to any of the exemplary embodiments described herein may be placed into recess 505. For example, a user (e.g., a construction worker or other repair technician) may quickly place system 600 into recess 505. The user may quickly attach exemplary assemblies together and/or leave some or all assemblies detached. The user may fill recess 505 in as little as a few seconds, and then move on to a new recess 505. The user may later remove system 600, store it in a vehicle, storage facility, or other location, and then later reuse the same system 600 at another recess 505. Users may thereby removably place and reuse some or all exemplary assemblies of system 600 in a wide range of locations (e.g., different recesses 505) over any desired duration of time. For example, a user may reuse exemplary assemblies of the same system 600 dozens, hundreds, or even thousands of times over a period of years or decades. For example, an infrastructure owner (e.g., municipality, state department of transportation, airport or bridge authority, commercial entity such as a factory or parking area operator, homeowner, or residential property owner such as a condo association or homeowner's association) may maintain any desired number of exemplary assemblies to employ over time at any desired number of repair locations over a period of months, years, or decades. For example the infrastructure owner may store the exemplary assemblies during warmer periods when pothole creation may not be prevalent, and then pull the exemplary assemblies out of storage for use during colder months when pothole creation is prevalent. For example, the exemplary apparatus and method may be used for temporary pothole repair (e.g., during cold months) until permanent repair is available (e.g., during warmer months or whenever desired).

As illustrated in FIG. 12, object 510 (e.g., a tire of a vehicle such as a car, truck, forklift, airplane, or other vehicle) may move across an upper surface of system 600. As external forces from object 510 are imparted to system 600, the exemplary material (e.g., material 225) disposed within assemblies of system 600 may for example exhibit viscoelastic characteristics in deforming under the external forces. System 600 may for example act as a shock absorber as object 510 passes over. When object 510 is for example a tire of a passenger vehicle, a movement of the vehicle may be relatively smooth as compared to recess 505 when system 600 is not utilized. Accordingly, instead of feeling a significant bump when going over empty recess 505 (e.g., pothole) as illustrated in FIG. 11, a driver of a vehicle may experience relatively smooth motion and travel when passing over recess 505 filled with system 600 as illustrated in FIG. 12. Assemblies of system 600 may also be ramp-shaped as described for example above, which may further reduce bumps for vehicles driving over recess 505 filled with system 600.

Figure 13:
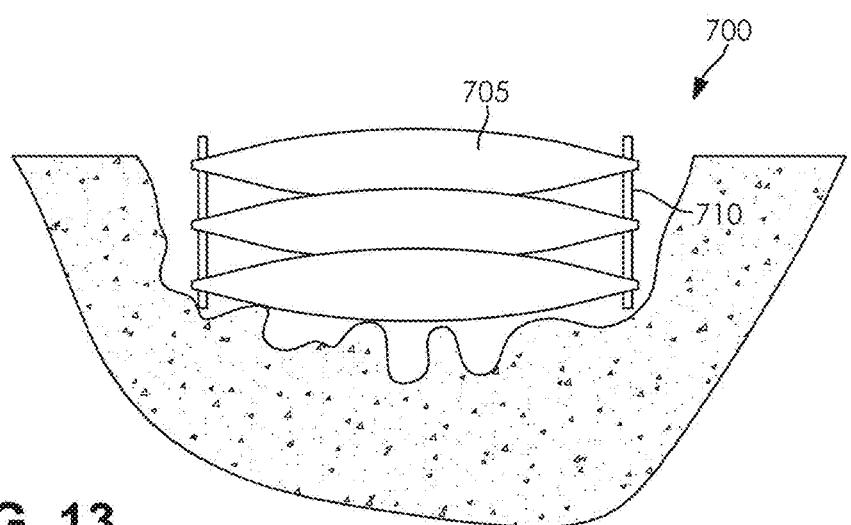
FIG. 13 is a side view of an exemplary apparatus in accordance with an embodiment of the present invention.

FIG. 13 illustrates another exemplary embodiment of the exemplary apparatus and method. System 700 may include a plurality of assemblies 705 that may be generally similar to assembly 205. System 700 may be placed in a recess generally similar to recess 505. System 700 may include a fastener 710 that may be generally similar to fastener 425 and that may fasten assemblies 705 together. For example, fastener 710 may be an elongated member formed from material similar to fastener 425, and may pass through aligned apertures of aperture assemblies of assemblies 705 that may be similar to aperture assemblies 415 and 420. For example, fastener 710 may be any suitable fastener such as an elongated threaded fastener (e.g., bolt and nut), elongated flexible fastener (e.g., rubber or elastomeric fastener that may be press-fit into the aligned apertures of the exemplary aperture assemblies), elongated clip, and/or any other suitable fastener. A plurality of assemblies 705 (e.g., a plurality of vertically-stacked assemblies 705) may also be fastened together by any other suitable attachment technique such as snap-fit devices, hook and loop devices, adhesive components, magnetic attachment components, wire or flexible member attachment devices (e.g., wires or ties), and/or any other suitable attachment technique. System 700 of any desired shape, depth, number of layers, and/or other desired configuration may thereby be provided.

Figure 14:
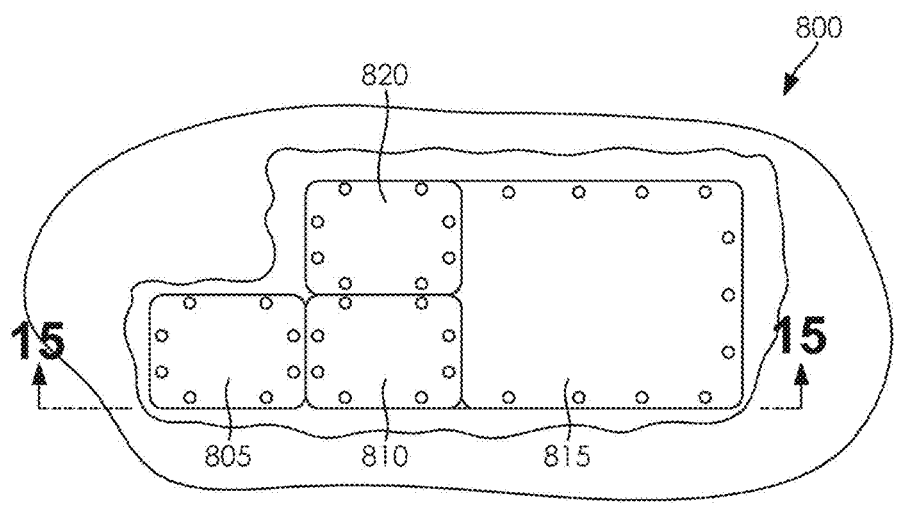
FIG. 14 is a top view of an exemplary apparatus in accordance with an embodiment of the present invention.
Figure 15:
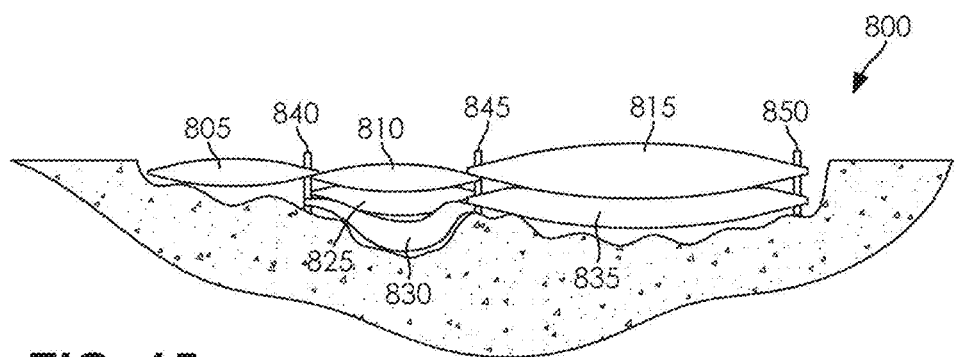
FIG. 15 is a side view of an exemplary apparatus in accordance with an embodiment of the present invention.

FIGS. 14 and 15 illustrate another exemplary embodiment of the exemplary apparatus and method. FIG. 15 illustrates a side view 15-15 taken through the exemplary system of FIG. 14. System 800 may include a plurality of assemblies 805, 810, 815, 820, 825, 830, and 835 that may be generally similar to assembly 205. System 800 may be placed in a recess generally similar to recess 505. System 800 may also include a plurality of fasteners 840, 845, and 850 that may be generally similar to fasteners 710. As shown in the exemplary embodiments of FIGS. 14 and 15, the exemplary system may be assembled in any desired configuration to fit within a recess of any shape. For example, varying numbers of exemplary assemblies may be stacked to fill a varying depth of a recess. For example as illustrated in FIG. 14, the exemplary assemblies may be arranged in an irregular pattern to fit within an irregular shape of the recess. Also for example as illustrated in FIG. 15, varying numbers of exemplary assemblies may be stacked based on a varying depth of a recess. For example, single assembly 805 may be attached to a triple stack of assemblies 810, 825, and 835, which may be attached to a double stack of assemblies 815 and 835. The exemplary assemblies may be attached by any arrangement of exemplary fasteners, similar to described for example above. For example, fastener 840 may attach single assembly 805 to triple-stacked assemblies 810, 825, and 830. Fastener 845 may attach triple-stacked assemblies 810, 825, and 830 to double-stacked assemblies 815 and 835, and fastener 850 may attached a distal end of double-stacked assemblies 815 and 835 together.

Figure 16:
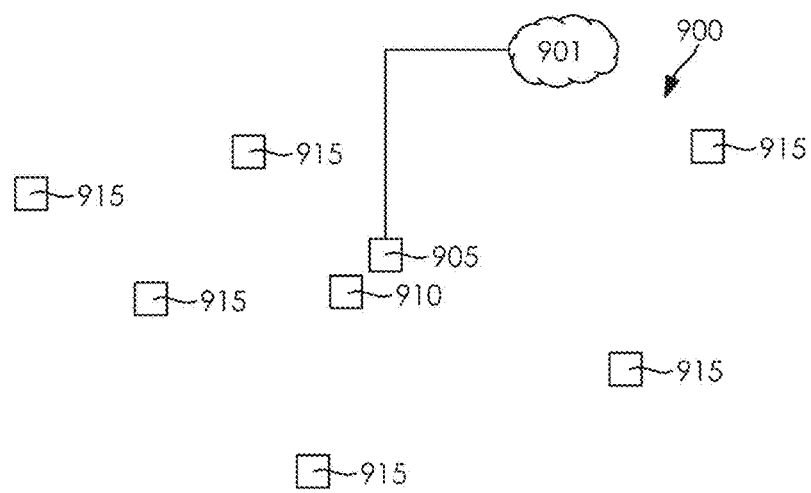
FIG. 16 is a schematic view of an exemplary system in accordance with an embodiment of the present invention.

FIG. 16 illustrates an exemplary system 900. System 900 may include a device 905 that may be a computing device (e.g., smartphone, tablet, computer, or any other suitable computing device or user interface) that may be connected to a network 901. For example, computing device 905 and network 901 may be similar respectively to computing device 1100 and network 1201 described below. For example, computing device 905 may include an RFID reader, a location sensor (e.g., a GPS sensor or other location sensor), a transceiver or other communication components for communicating with network 901, and/or a user interface for inputting data and receiving output from system 900. For example, processing of system 900 may be performed by and/or use components of computing device 905 and network 901. Computing device 905 may be a handheld or portable device and/or a vehicle-mounted device.

A user may use computing device 905 that may include an RFID reader to read RFID components that may be similar to component 245 disclosed above. RFID data of components similar to component 245 may be read by any suitable technique using computing device 905 such as, for example, by an interrogator (e.g., transmitter-receiver) or an optical scanner. It is also contemplated that computing device 905 may include visual components and/or optical character recognition components that may recognize a physically-marked identification number when the exemplary component similar to component 245 is a physical marking such as a serial number. It is also contemplated that a user may manually input identification data associated with component 245 or a given exemplary assembly into system 900 (e.g., by using computing device 905 or another device connected to network 901).

For example, a user may use computing device 905 to read RFID data of one or more assemblies 910 and/or 915 that may be similar to any of the above disclosed exemplary assemblies (e.g., assemblies 105, 205, or 305). For example as illustrated in FIG. 16, computing device 905 may read RFID data of relatively nearby assembly 910. A user may move about in any desired area or region, interrogating nearby RFID components of assemblies 910 and 915. For example, a user located in a vehicle may rapidly move within a region and collect data from any and/or substantially all assemblies 910 and/or 915 within a range of operation of computing device 905. As described for example above, the collected RFID data may be processed and analyzed along with any other data provided to network 901 (e.g., by sensors of computing device 905, sensors associated with a user, and/or any other data provided to system 900). For example, system 900 may process RFID data, location data, time data, ambient temperature data, and/or any other available data to track and analyze where, how often, when, and in what weather conditions assemblies 910 and/or 915 have been utilized.

In at least some exemplary embodiments, system 900 may provide detailed information to an infrastructure owner regarding a plurality of assemblies 910 and/or 915 being utilized to make surface repairs such as pothole repairs. For example, a State Department of Transportation or a municipality could utilize system 900 to track and maintain control of hundreds or thousands of exemplary assemblies disposed in various locations at various times and with various durations of usage over any desired area. Users of system 900 may use RFID tracking or similar data collection techniques to manage the deployment of any desired number of exemplary assemblies.

In at least some exemplary embodiments, the exemplary disclosed method may include providing one or more pothole repair assemblies (e.g., assembly 105, assembly 205, assembly 305, assembly 405, assembly 705, and/or any other exemplary assembly disclosed herein) including a pothole repair housing (e.g., housing members 210 and 215, and/or housing members 310 and 315) forming a cavity (e.g., cavity 220 and/or cavity 320), a viscoelastic material (e.g., material 225 and/or material 325) being disposed in the cavity, disposing the one or more pothole repair assemblies in a pothole at a first time, and removing the one or more pothole repair assemblies from the pothole at a second time. The cavity may be sealed by the pothole repair housing. The pothole repair housing may be flexible. The pothole may be subject to vehicular traffic between the first time and the second time. The exemplary disclosed method may further include using an RFID reader to read and collect data from one or more RFID components (e.g., component 245) that may be respectively disposed on the one or more pothole repair assemblies. The exemplary disclosed method may further include disposing the one or more pothole repair assemblies in a second pothole at a third time. The one or more pothole repair assemblies may include a plurality of pothole repair assemblies that are removably attachable to each other.

The exemplary disclosed apparatus, system, and method may provide an efficient and effective technique for quickly repairing surfaces. The exemplary apparatus and method may significantly reduce the time, labor, and number of users involved in surface repair (e.g., patching a pothole). The exemplary disclosed apparatus, system, and method may also significantly reduce the risk of failure when repairs are made to potholes during inclement and/or cold weather conditions. The exemplary apparatus, system, and method may also provide a removable and reusable repair system that may be used over a period of time at multiple repair locations. The exemplary disclosed apparatus, system, and method may also provide a relatively inexpensive system that infrastructure owners such as municipalities may use to address numerous potholes that may emerge during each cold season, which may be stored and reused over a period of years (e.g., over numerous freeze-thaw cycles).

Figure 17:
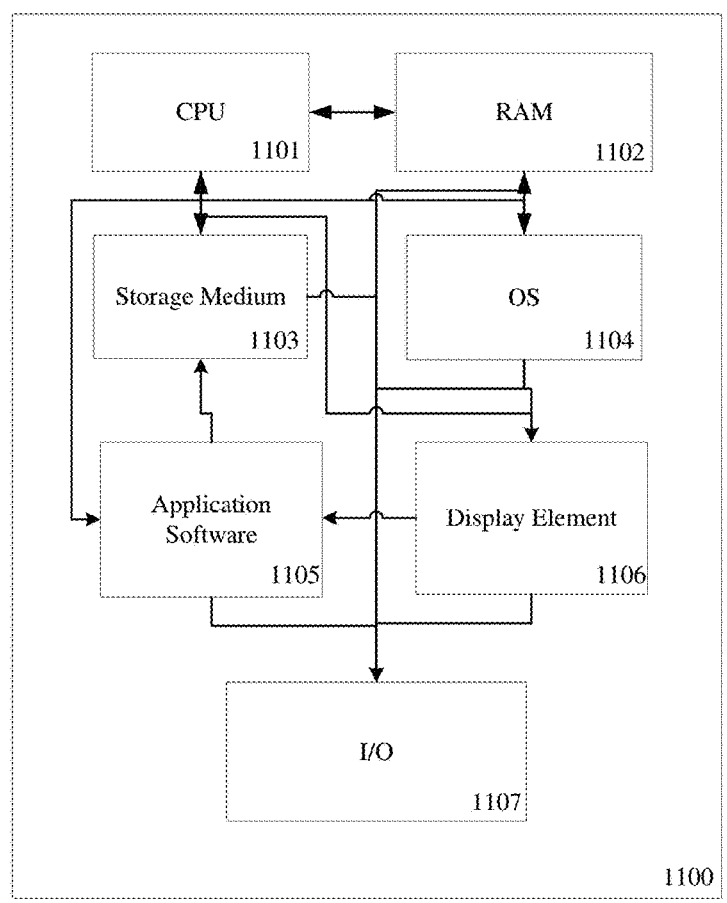
FIG. 17 is a schematic illustration of an exemplary computing device, in accordance with at least some exemplary embodiments of the present disclosure.

An illustrative representation of a computing device appropriate for use with embodiments of the system of the present disclosure is shown in FIG. 17. The computing device 1100 can generally be comprised of a Central Processing Unit (CPU, 1101), optional further processing units including a graphics processing unit (GPU), a Random Access Memory (RAM, 1102), a mother board 1103, or alternatively/additionally a storage medium (e.g., hard disk drive, solid state drive, flash memory, cloud storage), an operating system (OS, 1104), one or more application software 1105, a display element 1106, and one or more input/output devices/means 1107, including one or more communication interfaces (e.g., RS232, Ethernet, Wifi, Bluetooth®, USB). Useful examples include, but are not limited to, personal computers, smart phones, laptops, mobile computing devices, tablet PCs, touch boards, and servers. Multiple computing devices can be operably linked to form a computer network in a manner as to distribute and share one or more resources, such as clustered computing devices and server banks/farms.

Various examples of such general-purpose multi-unit computer networks suitable for embodiments of the disclosure, their typical configuration and many standardized communication links are well known to one skilled in the art, as explained in more detail and illustrated by FIG. 18, which is discussed herein-below.

According to an exemplary embodiment of the present disclosure, data may be transferred to the system, stored by the system and/or transferred by the system to users of the system across local area networks (LANs) (e.g., office networks, home networks) or wide area networks (WANs) (e.g., the Internet). In accordance with the previous embodiment, the system may be comprised of numerous servers communicatively connected across one or more LANs and/or WANs. One of ordinary skill in the art would appreciate that there are numerous manners in which the system could be configured and embodiments of the present disclosure are contemplated for use with any configuration.

In general, the system and methods provided herein may be employed by a user of a computing device whether connected to a network or not. Similarly, some steps of the methods provided herein may be performed by components and modules of the system whether connected or not. While such components/modules are offline, and the data they generated will then be transmitted to the relevant other parts of the system once the offline component/module comes again online with the rest of the network (or a relevant part thereof). According to an embodiment of the present disclosure, some of the applications of the present disclosure may not be accessible when not connected to a network, however a user or a module/component of the system itself may be able to compose data offline from the remainder of the system that will be consumed by the system or its other components when the user/offline system component or module is later connected to the system network.

Figure 18:
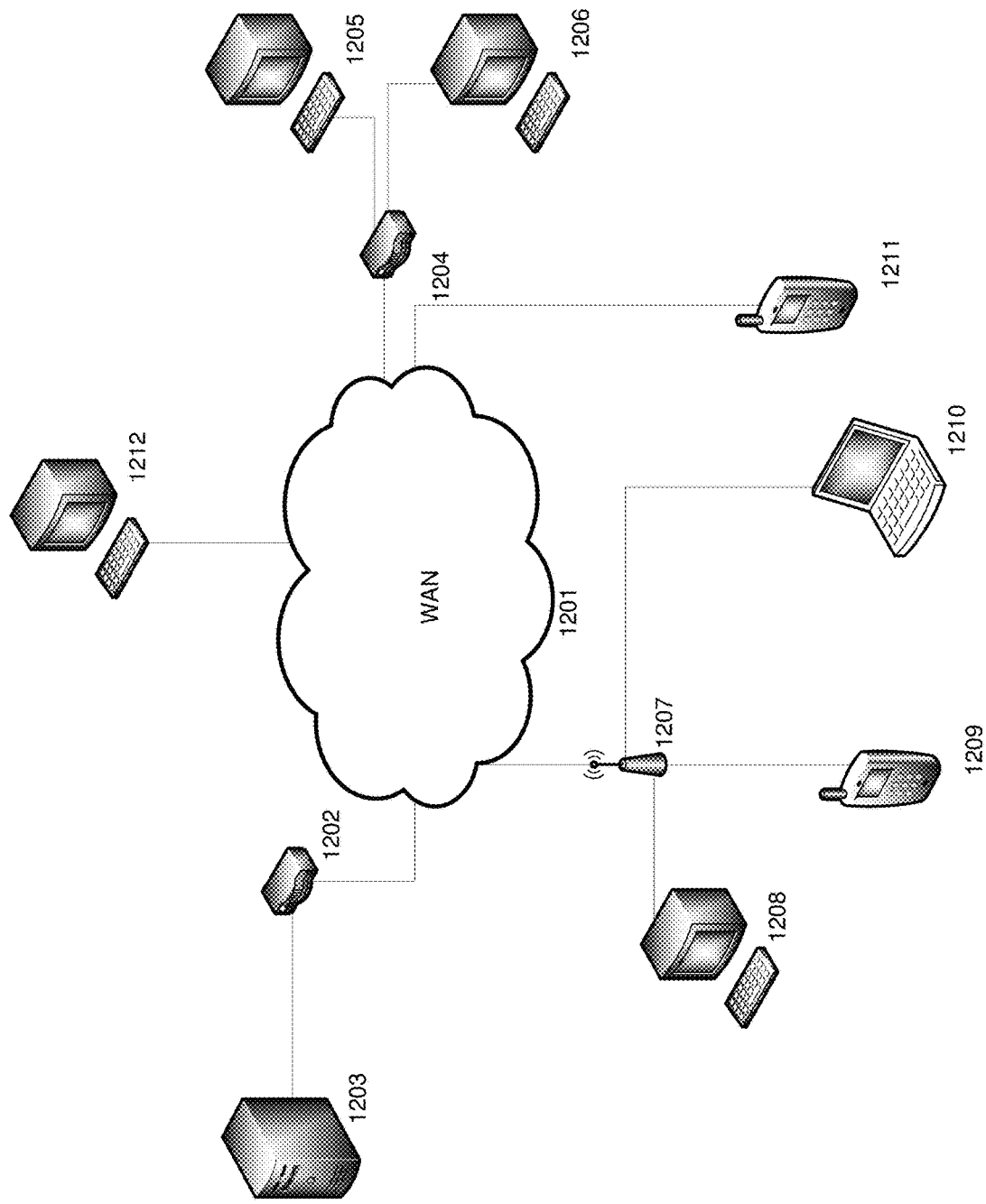
FIG. 18 is a schematic illustration of an exemplary network, in accordance with at least some exemplary embodiments of the present disclosure.

Referring to FIG. 18, a schematic overview of a system in accordance with an embodiment of the present disclosure is shown. The system is comprised of one or more application servers 1203 for electronically storing information used by the system. Applications in the server 1203 may retrieve and manipulate information in storage devices and exchange information through a WAN 1201 (e.g., the Internet). Applications in server 1203 may also be used to manipulate information stored remotely and process and analyze data stored remotely across a WAN 1201 (e.g., the Internet).

According to an exemplary embodiment, as shown in FIG. 18, exchange of information through the WAN 1201 or other network may occur through one or more high speed connections. In some cases, high speed connections may be over-the-air (OTA), passed through networked systems, directly connected to one or more WANs 1201 or directed through one or more routers 1202. Router(s) 1202 are completely optional and other embodiments in accordance with the present disclosure may or may not utilize one or more routers 1202. One of ordinary skill in the art would appreciate that there are numerous ways server 1203 may connect to WAN 1201 for the exchange of information, and embodiments of the present disclosure are contemplated for use with any method for connecting to networks for the purpose of exchanging information. Further, while this application refers to high speed connections, embodiments of the present disclosure may be utilized with connections of any speed.

Components or modules of the system may connect to server 1203 via WAN 1201 or other network in numerous ways. For instance, a component or module may connect to the system i) through a computing device 1212 directly connected to the WAN 1201, ii) through a computing device 1205, 1206 connected to the WAN 1201 through a routing device 1204, iii) through a computing device 1208, 1209, 1210 connected to a wireless access point 1207 or iv) through a computing device 1211 via a wireless connection (e.g., CDMA, GMS, 3G, 4G) to the WAN 1201. One of ordinary skill in the art will appreciate that there are numerous ways that a component or module may connect to server 1203 via WAN 1201 or other network, and embodiments of the present disclosure are contemplated for use with any method for connecting to server 1203 via WAN 1201 or other network. Furthermore, server 1203 could be comprised of a personal computing device, such as a smartphone, acting as a host for other computing devices to connect to.

The communications means of the system may be any means for communicating data, including image and video, over one or more networks or to one or more peripheral devices attached to the system, or to a system module or component. Appropriate communications means may include, but are not limited to, wireless connections, wired connections, cellular connections, data port connections, Bluetooth® connections, near field communications (NFC) connections, or any combination thereof. One of ordinary skill in the art will appreciate that there are numerous communications means that may be utilized with embodiments of the present disclosure, and embodiments of the present disclosure are contemplated for use with any communications means.

Traditionally, a computer program includes a finite sequence of computational instructions or program instructions. It will be appreciated that a programmable apparatus or computing device can receive such a computer program and, by processing the computational instructions thereof, produce a technical effect.

A programmable apparatus or computing device includes one or more microprocessors, microcontrollers, embedded microcontrollers, programmable digital signal processors, programmable devices, programmable gate arrays, programmable array logic, memory devices, application specific integrated circuits, or the like, which can be suitably employed or configured to process computer program instructions, execute computer logic, store computer data, and so on. Throughout this disclosure and elsewhere a computing device can include any and all suitable combinations of at least one general purpose computer, special-purpose computer, programmable data processing apparatus, processor, processor architecture, and so on. It will be understood that a computing device can include a computer-readable storage medium and that this medium may be internal or external, removable and replaceable, or fixed. It will also be understood that a computing device can include a Basic Input/Output System (BIOS), firmware, an operating system, a database, or the like that can include, interface with, or support the software and hardware described herein.

Embodiments of the system as described herein are not limited to applications involving conventional computer programs or programmable apparatuses that run them. It is contemplated, for example, that embodiments of the disclosure as claimed herein could include an optical computer, quantum computer, analog computer, or the like.

Regardless of the type of computer program or computing device involved, a computer program can be loaded onto a computing device to produce a particular machine that can perform any and all of the depicted functions. This particular machine (or networked configuration thereof) provides a technique for carrying out any and all of the depicted functions.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. Illustrative examples of the computer readable storage medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A data store may be comprised of one or more of a database, file storage system, relational data storage system or any other data system or structure configured to store data. The data store may be a relational database, working in conjunction with a relational database management system (RDBMS) for receiving, processing and storing data. A data store may comprise one or more databases for storing information related to the processing of moving information and estimate information as well one or more databases configured for storage and retrieval of moving information and estimate information.

Computer program instructions can be stored in a computer-readable memory capable of directing a computer or other programmable data processing apparatus to function in a particular manner. The instructions stored in the computer-readable memory constitute an article of manufacture including computer-readable instructions for implementing any and all of the depicted functions.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

The elements depicted in flowchart illustrations and block diagrams throughout the figures imply logical boundaries between the elements. However, according to software or hardware engineering practices, the depicted elements and the functions thereof may be implemented as parts of a monolithic software structure, as standalone software components or modules, or as components or modules that employ external routines, code, services, and so forth, or any combination of these. All such implementations are within the scope of the present disclosure. In view of the foregoing, it will be appreciated that elements of the block diagrams and flowchart illustrations support combinations of means for performing the specified functions, combinations of steps for performing the specified functions, program instruction technique for performing the specified functions, and so on.

It will be appreciated that computer program instructions may include computer executable code. A variety of languages for expressing computer program instructions are possible, including without limitation C, C++, Java, JavaScript, assembly language, Lisp, HTML, Perl, and so on. Such languages may include assembly languages, hardware description languages, database programming languages, functional programming languages, imperative programming languages, and so on. In some embodiments, computer program instructions can be stored, compiled, or interpreted to run on a computing device, a programmable data processing apparatus, a heterogeneous combination of processors or processor architectures, and so on. Without limitation, embodiments of the system as described herein can take the form of web-based computer software, which includes client/server software, software-as-a-service, peer-to-peer software, or the like.

In some embodiments, a computing device enables execution of computer program instructions including multiple programs or threads. The multiple programs or threads may be processed more or less simultaneously to enhance utilization of the processor and to facilitate substantially simultaneous functions. By way of implementation, any and all methods, program codes, program instructions, and the like described herein may be implemented in one or more thread. The thread can spawn other threads, which can themselves have assigned priorities associated with them. In some embodiments, a computing device can process these threads based on priority or any other order based on instructions provided in the program code.

Unless explicitly stated or otherwise clear from the context, the verbs "process" and "execute" are used interchangeably to indicate execute, process, interpret, compile, assemble, link, load, any and all combinations of the foregoing, or the like. Therefore, embodiments that process computer program instructions, computer-executable code, or the like can suitably act upon the instructions or code in any and all of the ways just described.

The functions and operations presented herein are not inherently related to any particular computing device or other apparatus. Various general-purpose systems may also be used with programs in accordance with the teachings herein, or it may prove convenient to construct more specialized apparatus to perform the required method steps. The required structure for a variety of these systems will be apparent to those of ordinary skill in the art, along with equivalent variations. In addition, embodiments of the disclosure are not described with reference to any particular programming language. It is appreciated that a variety of programming languages may be used to implement the present teachings as described herein, and any references to specific languages are provided for disclosure of enablement and best mode of embodiments of the disclosure. Embodiments of the disclosure are well suited to a wide variety of computer network systems over numerous topologies. Within this field, the configuration and management of large networks include storage devices and computing devices that are communicatively coupled to dissimilar computing and storage devices over a network, such as the Internet, also referred to as "web" or "world wide web".

Throughout this disclosure and elsewhere, block diagrams and flowchart illustrations depict methods, apparatuses (e.g., systems), and computer program products. Each element of the block diagrams and flowchart illustrations, as well as each respective combination of elements in the block diagrams and flowchart illustrations, illustrates a function of the methods, apparatuses, and computer program products. Any and all such functions ("depicted functions") can be implemented by computer program instructions; by special-purpose, hardware-based computer systems; by combinations of special purpose hardware and computer instructions; by combinations of general purpose hardware and computer instructions; and so on—any and all of which may be generally referred to herein as a "component", "module," or "system."

While the foregoing drawings and description set forth functional aspects of the disclosed systems, no particular arrangement of software for implementing these functional aspects should be inferred from these descriptions unless explicitly stated or otherwise clear from the context.

Each element in flowchart illustrations may depict a step, or group of steps, of a computer-implemented method. Further, each step may contain one or more sub-steps. For the purpose of illustration, these steps (as well as any and all other steps identified and described above) are presented in order. It will be understood that an embodiment can contain an alternate order of the steps adapted to a particular application of a technique disclosed herein. All such variations and modifications are intended to fall within the scope of this disclosure. The depiction and description of steps in any particular order is not intended to exclude embodiments having the steps in a different order, unless required by a particular application, explicitly stated, or otherwise clear from the context.

The functions, systems and methods herein described could be utilized and presented in a multitude of languages. Individual systems may be presented in one or more languages and the language may be changed with ease at any point in the process or methods described above. One of ordinary skill in the art would appreciate that there are numerous languages the system could be provided in, and embodiments of the present disclosure are contemplated for use with any language.

It should be noted that the features illustrated in the drawings are not necessarily drawn to scale, and features of one embodiment may be employed with other embodiments as the skilled artisan would recognize, even if not explicitly stated herein. Descriptions of well-known components and processing techniques may be omitted so as to not unnecessarily obscure the embodiments.

It will be apparent to those skilled in the art that various modifications and variations can be made to the disclosed apparatus, system and method. Other embodiments will be apparent to those skilled in the art from consideration of the specification and practice of the disclosed method and apparatus. It is intended that the specification and examples be considered as exemplary only, with a true scope being indicated by the following claims.

What is claimed is:

1. A surface recess repair assembly, comprising:
a surface recess repair housing forming a cavity; and
a fill material disposed in the cavity;
wherein the cavity is sealed by the surface recess repair housing;
wherein the surface recess repair housing is flexible;
wherein the fill material is a viscoelastic material; and
wherein the fill material has a material property of deforming from an initial shape under a load and then returning to the initial shape when the load is removed.

2. The surface recess repair assembly of claim 1, wherein the fill material is a solid material.

3. The surface recess repair assembly of claim 1, wherein the fill material has a constant behavior over a range of ambient temperatures of between about −30 degrees Fahrenheit and about 150 degrees Fahrenheit.

4. The surface recess repair assembly of claim 1, wherein the surface recess repair housing is substantially non-expandable.

5. The surface recess repair assembly of claim 2, wherein the solid material is a cork material.

6. The surface recess repair assembly of claim 1, wherein the surface recess repair housing is coated with a layer of flexible and elastic material that is impermeable to gaseous and liquid fluid flow.

7. The surface recess repair assembly of claim 2, wherein the solid material is a rubber material.

8. The surface recess repair assembly of claim 1, wherein the viscoelastic material is a viscoelastic foam material.

9. The surface recess repair assembly of claim 1, wherein the fill material includes material selected from the group consisting of ethylene-propylene diene monomer rubber, butyl rubber, synthetic polyisoprene, natural polyisoprene, polybutadiene, polynorbornene, styrene-butadiene rubber material, and cork material.

10. The surface recess repair assembly of claim 1, wherein the surface recess repair housing includes material selected from the group consisting of nylon material, elastomeric material, natural rubber, synthetic rubber, neoprene, latex, chloroprene, vinyl material, flexible Polyvinyl Chloride, Polyethylene, Polypropylene, and thermoplastic elastomers.

11. The surface recess repair assembly of claim 1, wherein the surface recess repair housing is a nylon material that is urethane-coated.

12. The surface recess repair assembly of claim 1, further comprising an RFID component.

13. A surface recess repair assembly, comprising:
a surface recess repair housing forming a cavity; and
a fill material disposed in the cavity;
wherein the cavity is sealed by the surface recess repair housing;
wherein the surface recess repair housing is flexible;
wherein the fill material is a viscoelastic material;
wherein the fill material has a material property of deforming from an original shape when subjected to an external force and then returning to the original shape when the external force is removed; and
wherein the fill material has a material property of exhibiting strain lagging stress under the external load.

14. The surface recess repair assembly of claim 13, wherein the fill material is a solid material.

15. The surface recess repair assembly of claim 14, wherein the solid material is selected from the group consisting of a cork material, a rubber material, and a foam material.

16. The surface recess repair assembly of claim 13, wherein the fill material is an open-celled foam material.

17. The surface recess repair assembly of claim 16, wherein the open-celled foam material is a polyurethane-based viscoelastic foam material.

18. A surface recess repair assembly, comprising:
a surface recess repair housing forming a cavity; and
a fill material disposed in the cavity;
wherein the cavity is sealed by the surface recess repair housing;
wherein the surface recess repair housing is flexible;
wherein the fill material is a viscoelastic material;
wherein the fill material has a material property of dissipating energy based on an application of an external load; and
wherein the fill material has a material property of exhibiting strain lagging stress under the external load.

19. The surface recess repair assembly of claim 18, wherein the fill material is a high damping rubber material.

20. The surface recess repair assembly of claim 18, wherein the fill material is a resilient rubber foam material.

* * * * *